United States Patent
Garcia et al.

(10) Patent No.: US 7,802,958 B2
(45) Date of Patent: Sep. 28, 2010

(54) VERSATILE TRAILER DECK

(75) Inventors: Anibal Garcia, Chino, CA (US); Myles Rohrlick, San Diego, CA (US); Thomas Reiner, Sherman Oaks, CA (US); Genevieve Gaspar, Hermosa Beach, CA (US)

(73) Assignee: The Boeing Company, Chicago, IL (US)

(*) Notice: Subject to any disclaimer, the term of this patent is extended or adjusted under 35 U.S.C. 154(b) by 0 days.

(21) Appl. No.: 11/681,053

(22) Filed: Mar. 1, 2007

(65) Prior Publication Data
US 2008/0213074 A1 Sep. 4, 2008

(51) Int. Cl.
*B60P 1/52* (2006.01)
*B60P 1/04* (2006.01)

(52) U.S. Cl. .............. 414/535; 414/482; 414/495; 414/679; 414/812; 414/813

(58) Field of Classification Search .......... 414/375, 414/481, 482, 485, 495, 345, 346, 392, 532, 414/535, 538, 679, 812, 813
See application file for complete search history.

(56) References Cited

U.S. PATENT DOCUMENTS

| | | | | |
|---|---|---|---|---|
| 3,120,408 A | * | 2/1964 | Pruss | 414/482 |
| 3,220,585 A | * | 11/1965 | McCartney et al. | 414/659 |
| 3,279,631 A | * | 10/1966 | McCartney | 414/532 |
| 3,288,315 A | * | 11/1966 | Bigden | 414/476 |
| 3,684,108 A | * | 8/1972 | Olson | 414/531 |
| 3,697,045 A | * | 10/1972 | Farley | 410/103 |
| 3,743,044 A | * | 7/1973 | Scheele | 180/24 |
| 3,854,610 A | * | 12/1974 | Carder | 414/503 |
| 3,899,092 A | | 8/1975 | Nordstrom | |
| 3,944,096 A | | 3/1976 | Carder | |
| 4,077,532 A | * | 3/1978 | Bryan | 414/416.09 |
| 4,312,619 A | * | 1/1982 | Anderson et al. | 414/347 |
| 4,348,150 A | | 9/1982 | Inghram et al. | |

(Continued)

FOREIGN PATENT DOCUMENTS

DE 200 16 115 U1 2/2001

(Continued)

OTHER PUBLICATIONS

European Patent Office (International Searching Authority); International Search Report and Written Opinion issued Jul. 10, 2009; International Patent Application No. PCT/US2009/037692 filed Mar. 19, 2009.

*Primary Examiner*—James Keenan
(74) *Attorney, Agent, or Firm*—Klintworth & Rozenblat IP LLC (57) ABSTRACT

The invention relates to versatile cargo trailer decks, and to methods for moving cargo onto such cargo trailer decks. In embodiment, a cargo trailer deck may have first and second moving apparatus attached to a deck member. The first moving apparatus may be adapted to move cargo between the back end of the deck member and the front end of the deck member, while the second moving apparatus may be adapted to rotate cargo from one orientation on the deck member to a second orientation on the deck member. The deck member may be adapted to move in backward, forward, left, right, vertical, and tilt directions, in order to align the deck member for loading and/or unloading cargo.

21 Claims, 7 Drawing Sheets

U.S. PATENT DOCUMENTS

| | | | | |
|---|---|---|---|---|
| 4,455,118 A | * | 6/1984 | Scharf | 414/494 |
| 4,541,768 A | * | 9/1985 | Walker et al. | 414/535 |
| 4,704,062 A | | 11/1987 | Hale | |
| 4,806,061 A | * | 2/1989 | Fenton | 414/475 |
| 4,907,935 A | * | 3/1990 | Mankey | 414/495 |
| 5,110,153 A | * | 5/1992 | Kallansrude et al. | 180/41 |
| 5,118,241 A | * | 6/1992 | Cochran et al. | 414/345 |
| 5,165,838 A | * | 11/1992 | Kallansrude et al. | 414/471 |
| 5,184,366 A | * | 2/1993 | Rawdon et al. | 14/71.5 |
| 5,218,794 A | | 6/1993 | Ehrlich | |
| 5,219,259 A | * | 6/1993 | Cochran et al. | 414/345 |
| 5,630,694 A | * | 5/1997 | Ihara | 414/495 |
| 5,662,453 A | * | 9/1997 | Gerstner et al. | 414/812 |
| 5,967,733 A | * | 10/1999 | Cash | 414/483 |
| 6,071,063 A | * | 6/2000 | McGrath et al. | 414/529 |
| 6,520,736 B2 | * | 2/2003 | Pratt | 414/812 |
| 6,622,846 B1 | * | 9/2003 | Dean | 198/370.09 |
| 7,134,829 B2 | * | 11/2006 | Quenzi et al. | 414/482 |
| 7,618,227 B2 | * | 11/2009 | Smith | 414/484 |
| 2004/0080206 A1 | * | 4/2004 | Parsons | 298/22 R |
| 2004/0155230 A1 | * | 8/2004 | Fortin | 254/219 |

FOREIGN PATENT DOCUMENTS

| | | |
|---|---|---|
| DE | 100 14 990 A1 | 10/2001 |
| JP | 63-173739 A * | 7/1988 |
| WO | WO 96/03304 | 2/1996 |

* cited by examiner

VERSATILE TRAILER DECK

BACKGROUND OF THE INVENTION

Trailer decks are commonly used to carry cargo on highways and off-road. Such cargo may comprise air cargo pallets, intermodal containers, CROPS (Containerized Roll-In/Out Platform), flatracks, J-MIPS (Joint Mobility Intermodal Platform), and other types of cargo. This cargo is often transferred on and off the trailer decks from other trailers, trucks, cargo planes, the ground, warehouse floors, military vehicles, and from other types of areas, devices, and apparatus. Due to the diversity of the cargo loads, the existing trailer deck designs often may only accommodate one type of cargo from one source. Further, the existing trailer deck designs often are not suited to accept cargo directly from an aircraft. K-loaders, and other types of equipment, are often required to unload and load cargo from an aircraft onto existing trailer deck designs. These limitations may result in increased loading time, loading costs, loading complexity, and/or other types of problems.

A versatile trailer deck design, and a method for its use, is needed to decrease one or more problems associated with one or more of the existing trailer deck designs.

SUMMARY OF THE INVENTION

In one aspect of the invention, a cargo trailer deck is provided which comprises a deck member, a first moving apparatus attached to the deck member, and a second moving apparatus attached to the deck member. The deck member comprises a front end, a back end, a left side, and a right side. The first moving apparatus is adapted to move cargo between the back end of the deck member and the front end of the deck member. The second moving apparatus is adapted to rotate cargo from one orientation on the deck member to a second orientation on the deck member.

In another aspect of the invention, a cargo trailer deck is provided which comprises a frame member adapted to be attached to a vehicle, a plurality of swing-arm members, a deck member, and a first moving apparatus. The deck member comprises a front end, a back end, a left side, and a right side. The swing-arm members and the frame member are attached to the deck member. The swing-arm members are adapted to move the deck member in a backward direction away from the frame member, in a forward direction towards the frame member, in a left side direction, in a right side direction, in a vertical direction, and in a tilt direction. The first moving apparatus is attached to the deck member, and is adapted to move cargo between the back end of the deck member and the front end of the deck member.

In a further aspect of the invention, a method of moving cargo on a trailer deck is disclosed. In one step, a trailer deck is provided which comprises a deck member, and first and second moving apparatus attached to the deck member. The deck member comprises a front end, a back end, a left side, and a right side. In another step, cargo is moved between the back end of the deck member and the front end of the deck member utilizing the first moving apparatus. In still another step, cargo is rotated from one orientation on the deck member to a second orientation on the deck member utilizing the second moving apparatus.

These and other features, aspects and advantages of the invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Figure 1:
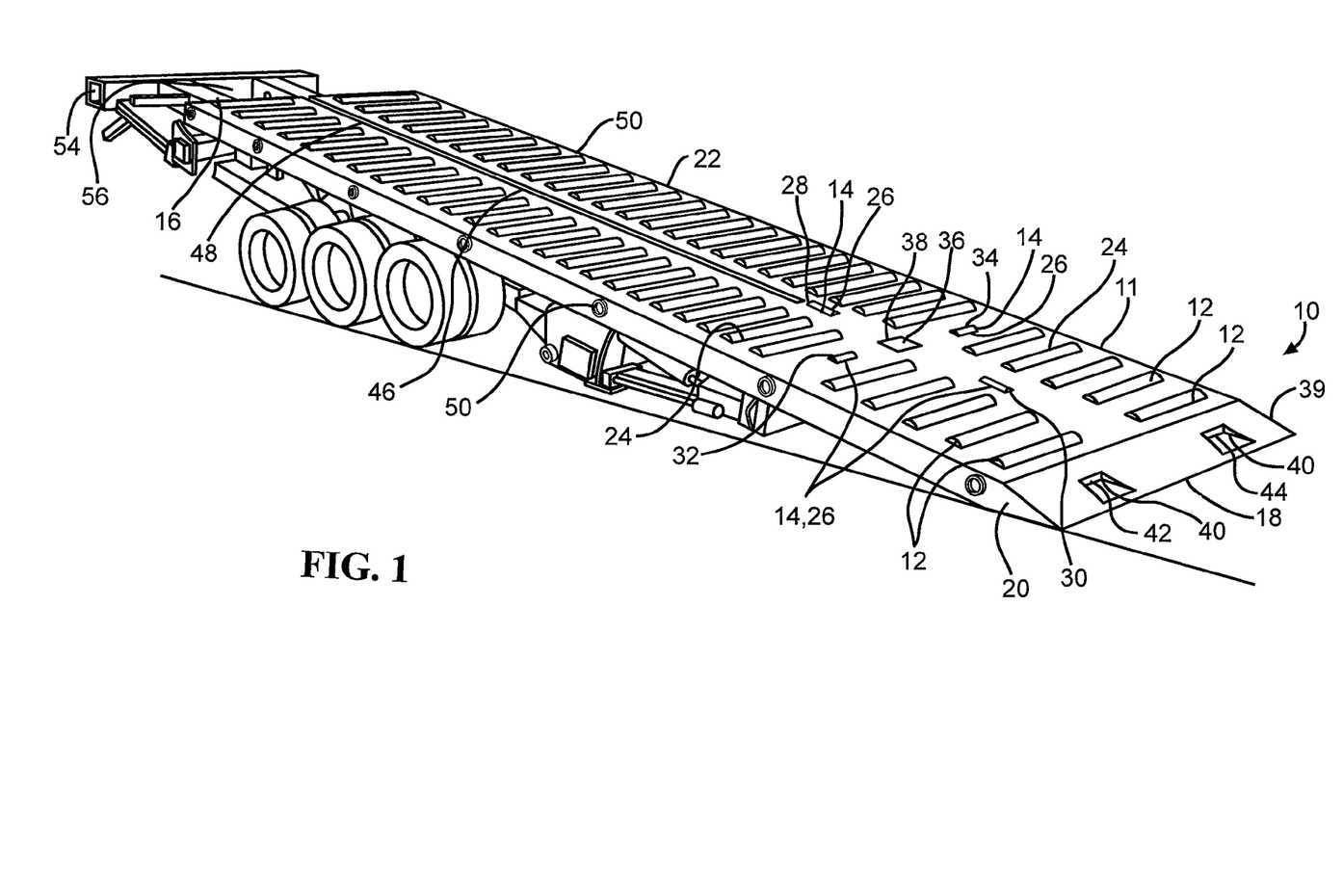
FIG. 1 depicts a perspective view of one embodiment of a cargo trailer deck under the invention.
Figure 2:
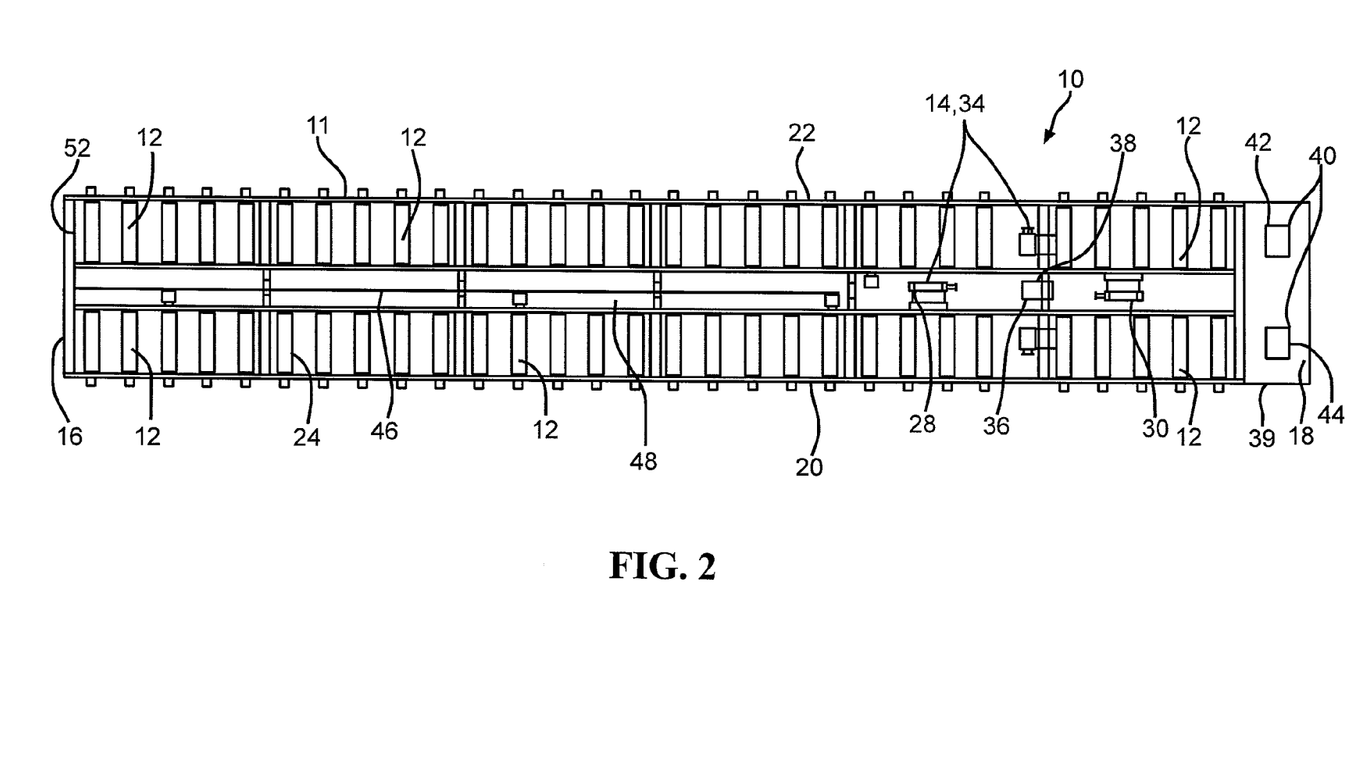
FIG. 2 depicts a top view of the cargo trailer deck of FIG. 1.

FIG. 1 depicts a perspective view of one embodiment of a cargo trailer deck 10 under the invention. FIG. 2 depicts a top view of the cargo trailer deck 10 of FIG. 1. As shown in FIGS. 1 and 2, the cargo trailer deck 10 may contain a deck member 11, first moving apparatus 12, and second moving apparatus 14. The deck member 11 may comprise a front end 16, back end 18, left side 20, and right side 22. Preferably, the deck member 11 is made of steel, but it may be made of any type of material suitable to hold the weight of the cargo to be disposed on the deck 10.

The first moving apparatus 12 may be attached to the deck member 11, and may be adapted to move cargo disposed on the deck member 11 between the back end 18 and the front end 16 of deck member 11. In such manner, cargo may be loaded and unloaded from the deck 10. The cargo may comprise air cargo pallets, commercial and military pallets, commercial and military containers, military cargo platforms, and various other types of cargo. The first moving apparatus 12 may comprise a plurality of rollers disposed, from the back end 18 to the front end 16 of deck member 11, in a spaced apart arrangement partially within openings 24 within deck member 11. A portion of the rollers may extend out of the openings 24 and beyond the deck member 11. The rollers may be disposed perpendicularly to the left side 20 and right side 22 of deck member 11. When the rollers are rotated using a motor, cargo disposed on the rollers may be moved along the deck member 11.

The second moving apparatus 14 may be attached to the deck member 11, and may be adapted to rotate cargo from one orientation on the deck member 11 to a second orientation on the deck member 11. In such manner, cargo which is disposed on the deck member 11 may be rotated into varying orientations to facilitate loading and unloading of cargo from deck member 11. The second moving apparatus 14 may comprise a plurality of rollers disposed within openings 26 within deck member 11, with some of the rollers disposed perpendicularly to other rollers. More particularly, as shown in FIGS. 1 and 2, the second moving apparatus 14 may comprise two spaced apart rollers 28 and 30 aligned in positions parallel to the left and right sides 20 and 22 of deck member 11, and two spaced apart rollers 32 and 34 aligned in positions perpendicular to the left and right sides 20 and 22 of deck member 11. This orientation of the rollers 28, 30, 32, and 34 may allow for cargo to be rotated into different orientations on deck member 11 by, when cargo is disposed over each of the rollers, concurrently rotating the rollers using a motor. When the rollers 28 and 30 are rotated alone, without rollers 32 and 34 being rotated, cargo may be moved in a lateral direction along the deck member 11 in a direction which is perpendicular to the left and right sides 20 and 22 of deck member 11.

A turning member 36 may be disposed in an area between the rollers 28, 30, 32, and 34. The turning member 36 may comprise a rotate-able plate which is adapted to retract and extend out of an opening 38 within deck member 11. Similarly, the rollers 28, 30, 32, and 34 may be adapted to extend out of and retract within openings 26 within deck member 11. The rollers 28, 30, 32, and 34 and turning member 36 may be kept in positions completely retracted within the openings 26 and 38 within deck member 11 when cargo is being loaded, using the first moving apparatus 12, onto deck member 11. When the cargo is disposed over the rollers 28, 30, 32, and 34 and turning member 36, the rollers and turning member may be extended out of the openings to come into contact with the cargo. The rotate-able turning member 36 may raise the cargo slightly off the deck member 11. When rotated against portions of the cargo extending beyond the turning member 36, rollers 28, 30, 32, and 34 may force the cargo and rotate-able turning member 36 to rotate in order to locate the cargo into another configuration on top of deck member 11. When the cargo is in the desired orientation on top of deck member 11, the turning member 36 and rollers 28, 30, 32, and 34 may be retracted, and the first moving apparatus 12 may then be used to move the cargo in a longitudinal direction along deck member 11.

The deck member 11 may have a tapered back end 39, allowing for easier loading of cargo onto the deck member 11 when the tapered back end 39 is aligned with the ground or another loading surface. Third moving apparatus 40 may be attached to the tapered back end 39. The third moving apparatus 40 may comprise two or more spaced apart rollers which are partially disposed within openings 42 and 44 within the tapered back end 39, with portions of the rollers extending above the deck member 11. The rollers may be disposed perpendicularly to the left side 20 and right side 22 of deck member 11. When the rollers are rotated using a motor, cargo disposed on the rollers may be moved along the tapered back end 39. Alternately, the cargo may be moved by a winch, by drag chain(s), manually or by other means.

In other embodiments, varying types, quantities, configurations, sizes, positions, and orientations may be used for each of deck member 11, and the first, second, and third moving apparatus 12, 14, and 40. For instance, one or more of the first, second, and third moving apparatus 12, 14, and 40 may comprise moving casters, moving belt members, and other types of moving apparatus, in varying numbers, locations, and orientations.

A cable winch member 46 may be disposed in an opening 48 extending at least partially from the front end 16 of the deck member 11 to the back end 18 of the deck member 11. The cable winch member 46 may be adapted to be stored in the opening 48 when not in use. The cable winch member 46 may be attached to cargo and the cargo may be winched up or down the deck member 11. A plurality of tie-down rings 50 may be disposed in the left and right sides, 20 and 22, of the deck member 11. The tie-down rings 50 may be used to tie down cargo loaded on deck member 11 using ropes extending across the cargo and deck member 11. A stop member 52 may be attached to the front end 16 of the deck member 11. The stop member 52 may comprise a vertically extending stop surface which is adapted to prevent cargo from falling off the front end 16 of deck member 11. In other embodiments, various numbers, types, configurations, orientations, and locations of stop members 52 may be utilized.

As shown in FIG. 1, the cargo trailer deck 10 may have a frame member 54 attached to the deck member 11 which is adapted to be attached to a vehicle to allow the cargo trailer deck 10 to be moved using the vehicle. The frame member 54 may be adapted to pivot into varying positions. The frame member 54 may be attached and supported by the frame of the chassis, and may be moved on the chassis fore-and-aft and left-and-right. The swing-arm members 58 may comprise part of the chassis suspension. The frame member 54 may be supported on other chasses. The deck member 11 of the cargo trailer deck 10, as supported by the chassis, may be raised and lowered, may be tilted left and right in a rolling motion, and/or may be moved fore and aft in a pitch motion. FIGS. 3-6 depict side views of the cargo trailer deck 10 in various orientations with respect to a vehicle 56 to which its frame 54 member is attached. As shown, a plurality of multi-position, swing-arm members 58 may be attached at ends 60 to the deck member 11 and at other ends 62 to wheels 64. The swing-arm members 58 may be attached to deck member 11 using ball joints, or other types of devices, which allow the swing-arm members 58 to have free rotation in varying directions. The swing-arm members 58 may be adapted to move the deck member 11, using a hydraulic actuator or other device, in a backward direction 66 away from frame member 54, in a forward direction 68 towards frame member 54, in a left-side direction 70, in a right-side direction 72, in a vertical direction 74, and/or in a tilt direction 76 where the deck member 11 is in a non-parallel position relative to the ground.

Figure 3:
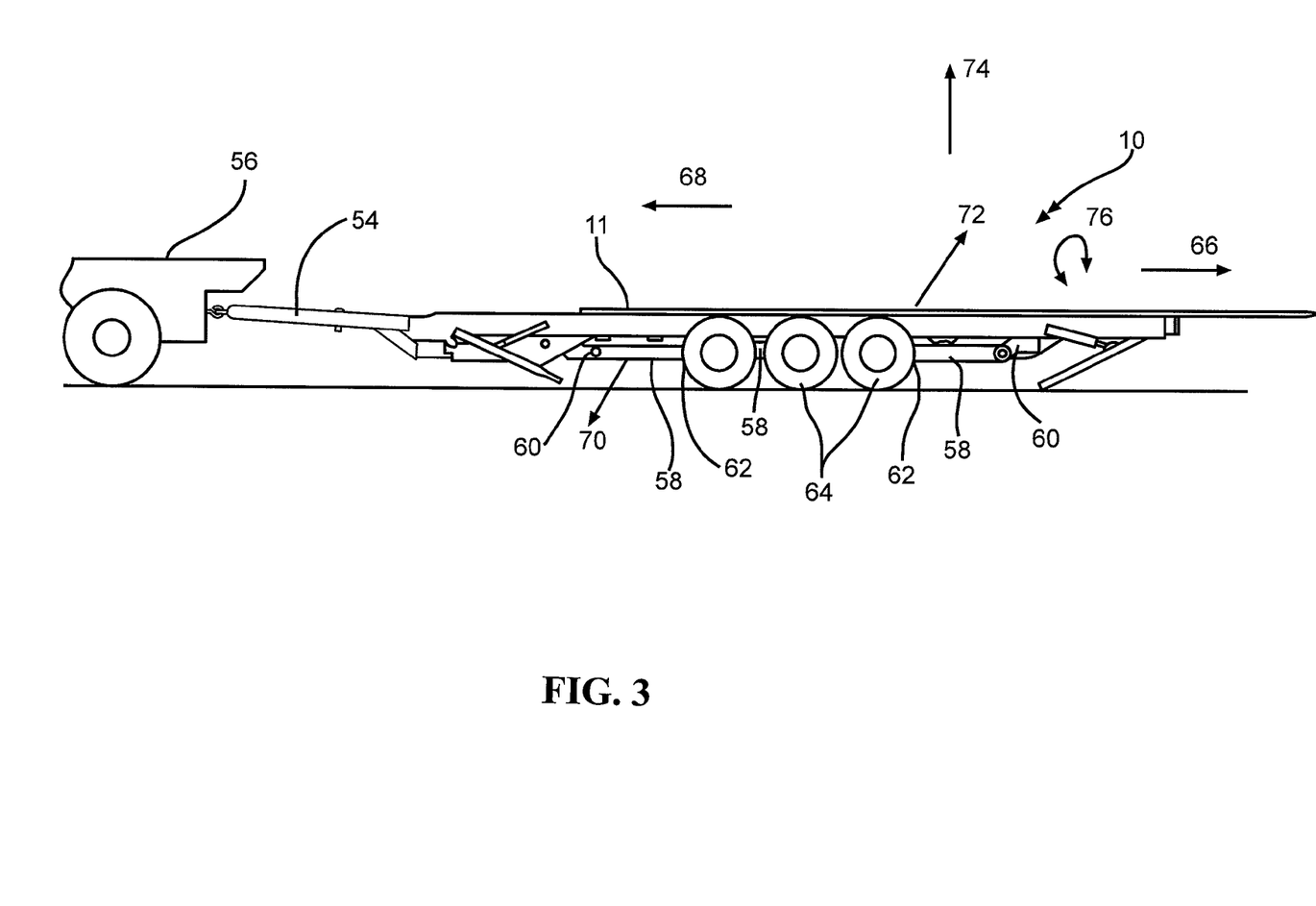
FIGS. 3-6 depict side views of the cargo trailer deck of FIG. 1 in various orientations with respect to a vehicle to which it is attached.
Figure 4:
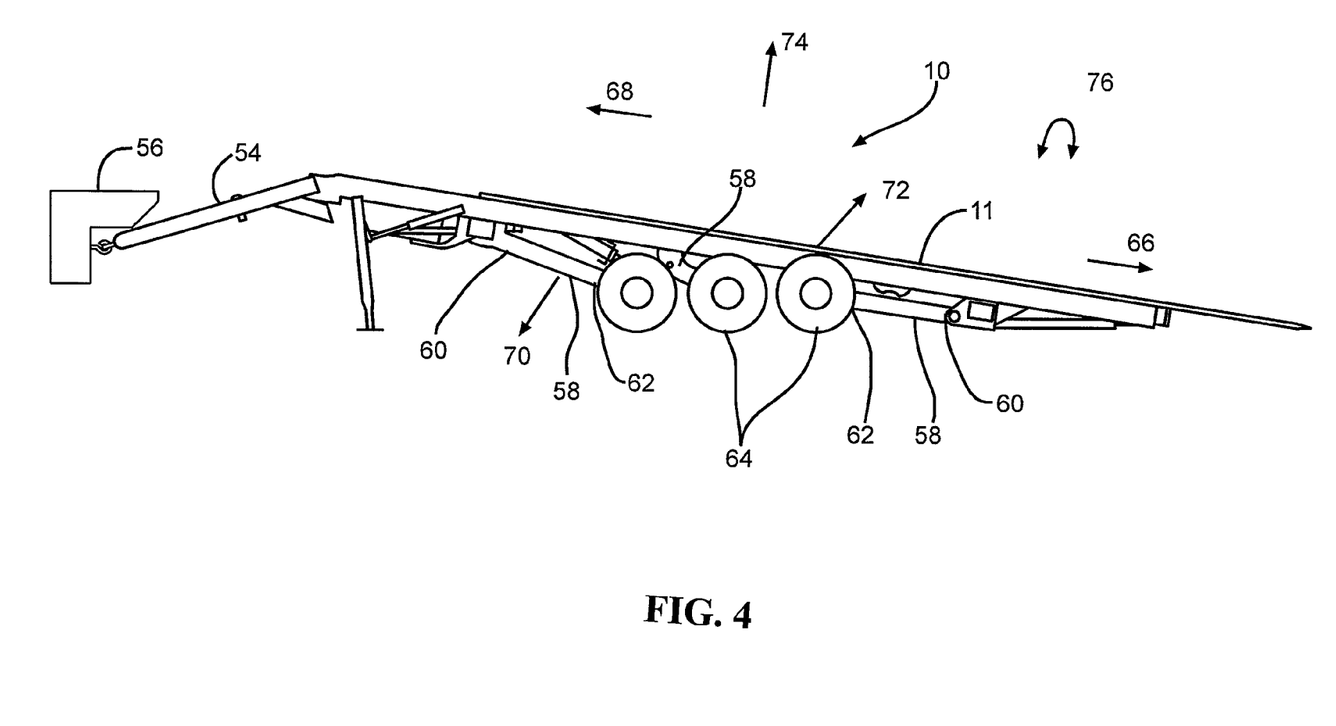
Figure 5:
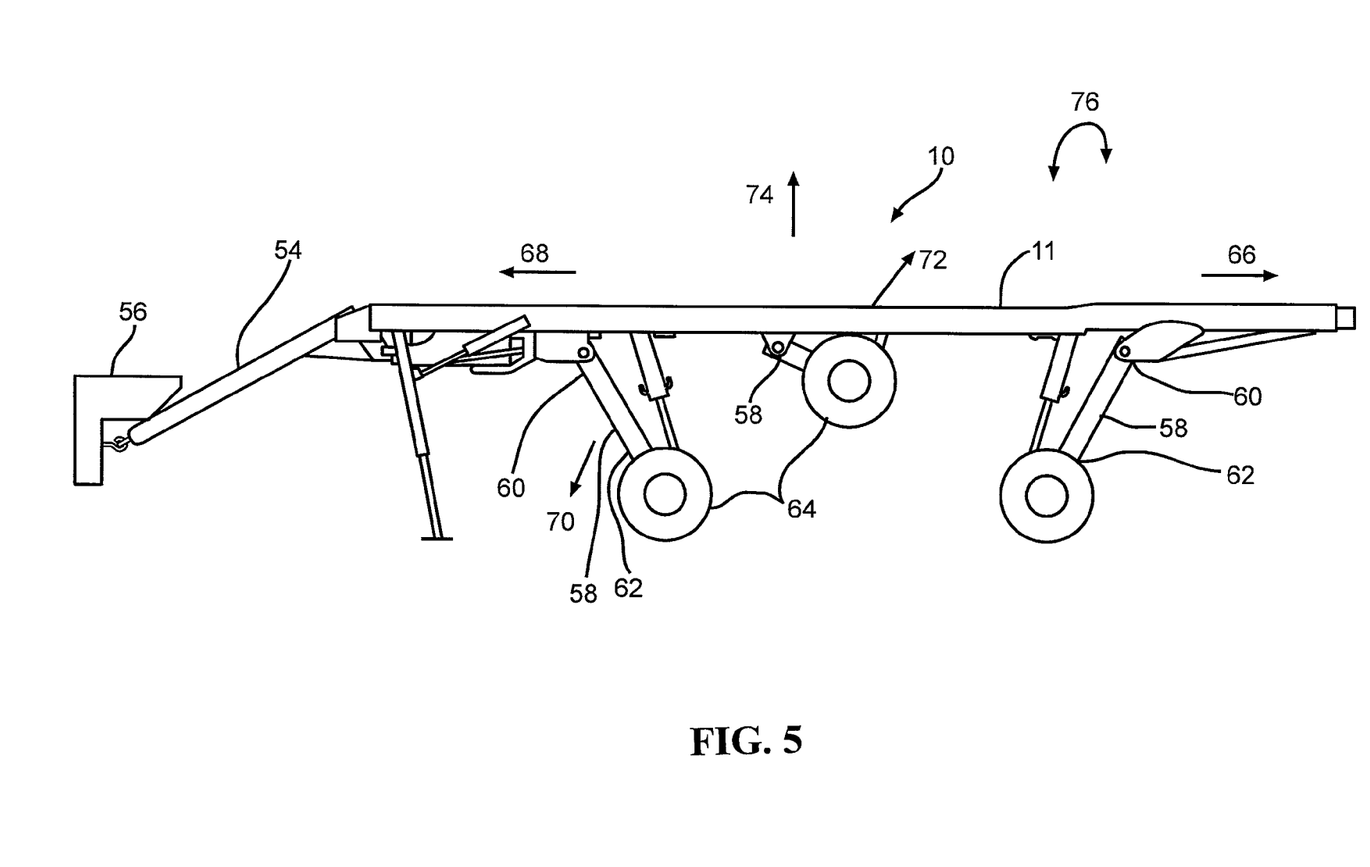
Figure 6:
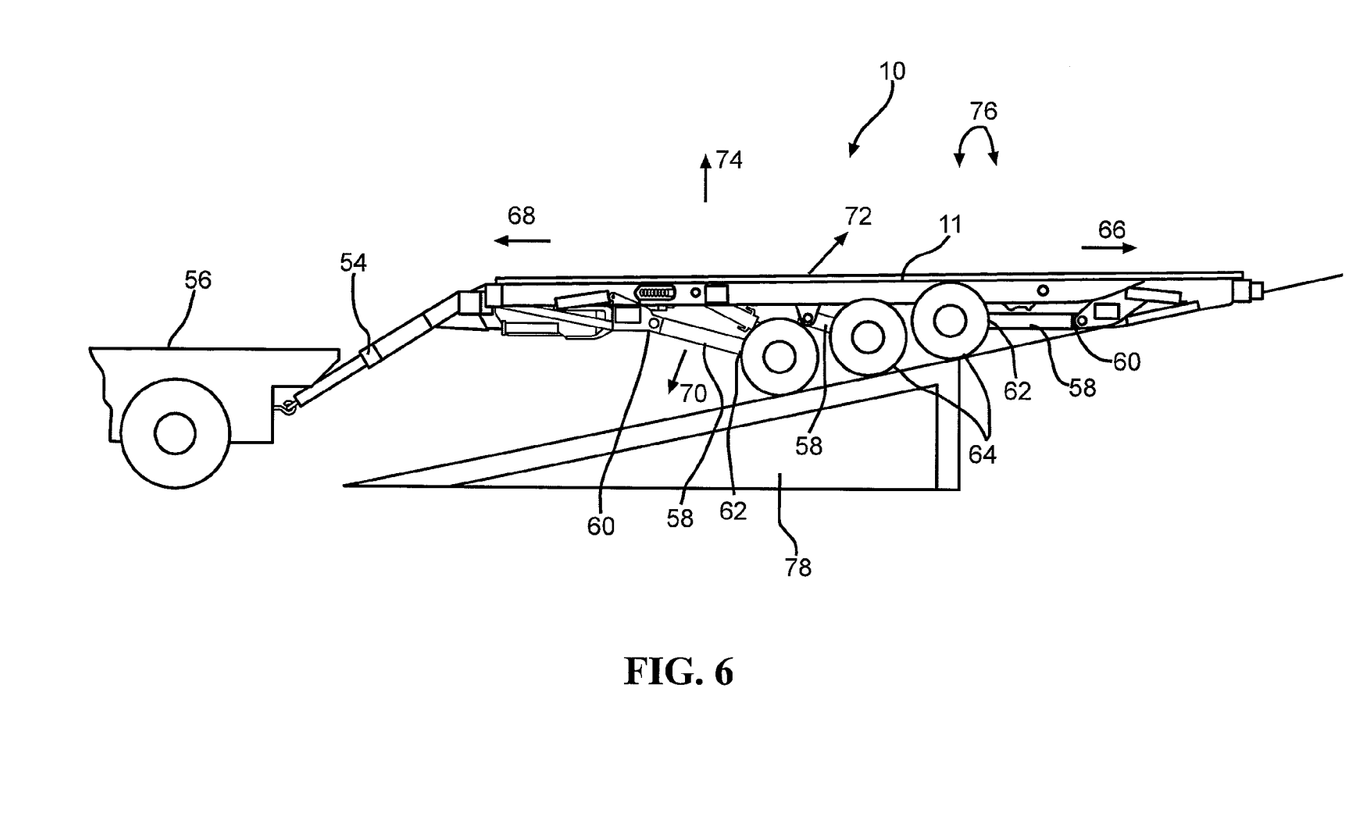

FIG. 3 shows the position of the swing-arms 58 when the cargo trailer deck 10 is being towed behind a vehicle 56 in a down position. FIG. 4 shows the position of the swing-arms 58 when deck member 11 is moved in a backward and downward direction in order to load cargo onto the trailer deck 10. FIG. 5 shows the position of the swing-arms 58 when deck member 11 is moved in an upward direction. FIG. 6 shows the position of the swing-arms 58 when the trailer deck 10 is on a ramp 78. The versatility of the swing-arms 58 may allow the trailer deck 10 to be put into a multitude of positions, locations, orientations, and configurations in order to more easily allow for the direct loading of cargo onto or off the trailer deck 10. In such manner, the trailer deck 10 may be moved into a position to directly load and/or unload cargo from an aircraft compartment and/or door, or other type of vehicle, in order to eliminate the necessity of additional moving devices.

Figure 7:
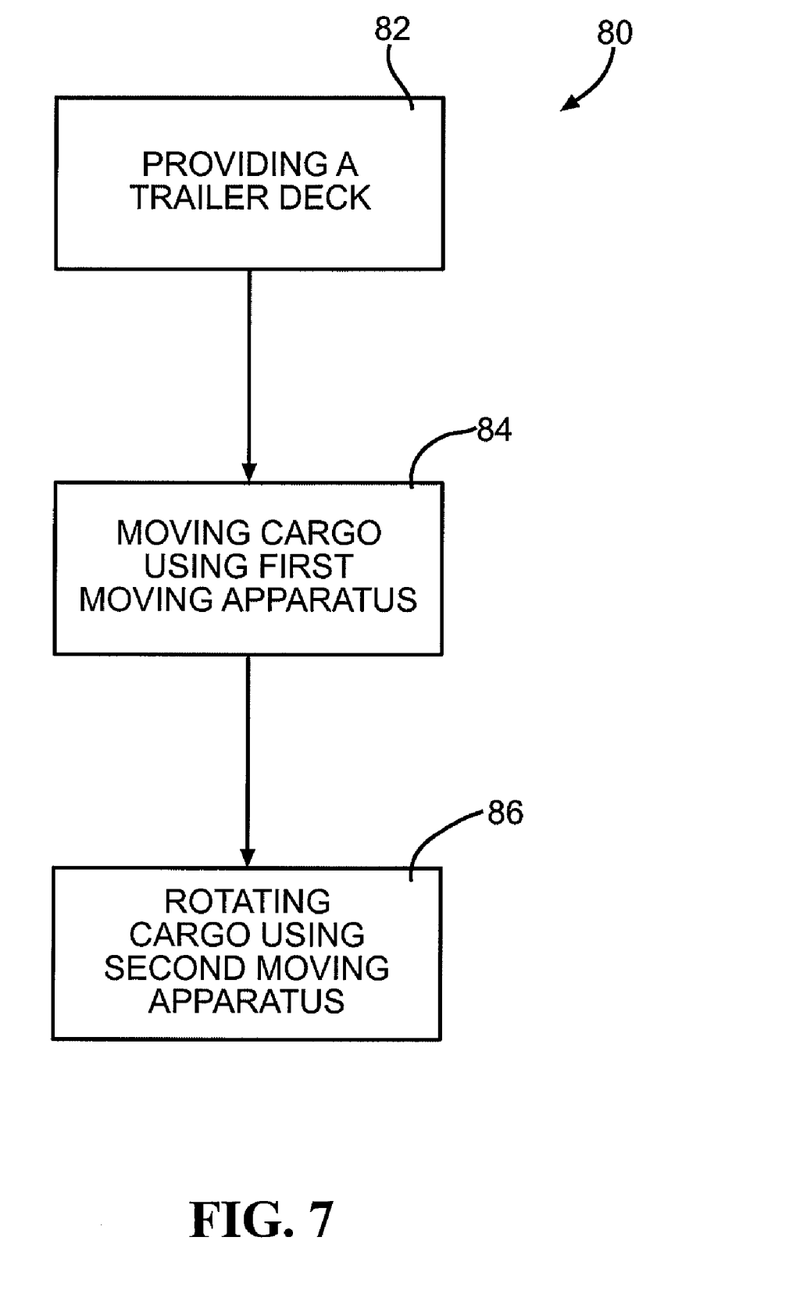
FIG. 7 is a flowchart depicting one embodiment of a method under the invention of moving cargo on a trailer deck.

FIG. 7 is a flowchart depicting a method 80 of moving cargo on a trailer deck. In one step 82, a trailer deck is provided. The trailer deck may comprise a deck member having a front end, a back end, a left side, and a right side. First and second moving apparatus may be attached to the deck member. In other embodiments, the trailer deck may comprise any of the embodiments disclosed herein. In another step 84, cargo may be moved between the back end of the deck member and the front end of the deck member utilizing the first moving apparatus. In yet another step 86, the cargo may be rotated from one orientation on the deck member to a second orientation on the deck member utilizing the second moving apparatus.

An additional step may comprise attaching a cable winch or drag chain(s) to the cargo and winching or dragging the cargo towards or away from the front end of the deck member. Yet another step may comprise moving the cargo sideways along the deck member utilizing the second moving apparatus. Still another step may comprise, utilizing swing-arms attached to the deck member, one or more of moving the deck member in backward, forward, left, right, vertical, and/or tilt directions. In such manner, the deck member may be moved into the proper alignment to load and/or unload cargo from or onto the deck member from or onto a vehicle such as an aircraft, military vehicle, truck, building, or other type of loading area, apparatus, or device.

The invention may make it less difficult to load and/or unload cargo, may decrease costs, may decrease the amount of equipment required, may save time, may increase safety, may decrease the likelihood that cargo will be damaged, and/or may reduce one or more other loading/unloading problems associated with one or more prior art apparatus and/or methods.

It should be understood, of course, that the foregoing relates to exemplary embodiments of the invention and that modifications may be made without departing from the spirit and scope of the invention as set forth in the following claims.

We claim:

1. A cargo trailer deck comprising:
   a frame member for attaching to a vehicle, wherein the frame member is adapted to pivot into varying positions;
   a deck member attached to the frame member, the deck member comprising a front end, a back end, a left side, a right side, a bottom side, and a top side, wherein the back end is tapered from the top side to the bottom side;
   a first moving apparatus attached to said deck member, wherein said first moving apparatus comprises a first plurality of rollers disposed in parallel, spaced-apart alignment between and parallel to the front and back ends of the deck member, wherein the first plurality of rollers are further disposed perpendicular to the left and the right sides of the deck member, and wherein the first plurality of rollers are for moving cargo between said back end of said deck member and said front end of said deck member;
   a second moving apparatus attached to said deck member, wherein said second moving apparatus comprises a second plurality of rollers, wherein at least two of the second plurality of rollers are disposed parallel to the first plurality of rollers and at least another two of the second plurality of rollers are disposed perpendicular to the first plurality of rollers, and wherein the second plurality of rollers are for rotating cargo from one orientation on said deck member to a second orientation on said deck member;
   a cable winch member disposed in an opening in said deck member extending from said front end to said second moving apparatus; and
   a rotatable and retractable turning member comprising a plate disposed between the at least two of the second plurality of rollers, and disposed between the at least another two of the second plurality of rollers, wherein each of the at least two of the second plurality of rollers, the at least another two of the second plurality of rollers, and the rotatable and retractable turning member are configured to completely retract within the deck member in one position, and to extend out of the deck member in another position.

2. The cargo trailer deck of claim 1 wherein a third moving apparatus is disposed in said tapered back end for moving cargo up and down the tapered back end.

3. The cargo trailer deck of claim 2 wherein the third moving apparatus comprises a roller.

4. The cargo trailer deck of claim 1 wherein tie-down rings are disposed in said left and right sides of said deck member.

5. The cargo trailer deck of claim 1 wherein a stop member is attached to said front end of said deck member.

6. The cargo trailer deck of claim 1 wherein said second moving apparatus is for moving cargo sideways along said deck member between the left and right sides of the deck member.

7. The cargo trailer deck of claim 1 wherein said first and second moving apparatus are attached to a motor.

8. The cargo trailer deck of claim 1 wherein said trailer deck is for loading cargo at least one of onto or off an aircraft.

9. The cargo trailer deck of claim 1 wherein the second moving apparatus is for rotating cargo a full rotation relative to the deck member.

10. The cargo trailer deck of claim 1 wherein the second plurality of rollers are aligned substantially in a circle to rotate cargo from one orientation to another relative to the deck member.

11. The cargo trailer deck of claim 10 wherein the plate is disposed in a center of the circle.

12. A method of moving cargo on a trailer deck comprising:
    providing a trailer deck comprising: a frame member for attaching to a vehicle, wherein the frame member is adapted to pivot into varying positions; a deck member attached to the frame member, the deck member comprising a front end, a back end, a left side, a right side, a bottom side, and a top side, with the back end tapered from the top side to the bottom side; a first moving apparatus attached to said deck member, wherein the first moving apparatus comprises a first plurality of rollers disposed in parallel, spaced-apart alignment between and parallel to the front and back ends of the deck member, and the first plurality of rollers are further disposed perpendicular to the left and the right sides of the deck member; a second moving apparatus attached to said deck member, wherein the second moving apparatus comprises a second plurality of rollers, wherein at least two of the second plurality of rollers are disposed parallel to the first plurality of rollers and at least another two of the second plurality of rollers are disposed perpendicular to the first plurality of rollers; a cable winch member disposed in an opening in said deck member extending from said front end to said second moving apparatus; and a rotatable and retractable turning member comprising a plate disposed between the at least two of the second plurality of rollers, and disposed between the at least another two of the second plurality of rollers;
    moving cargo between the back end of the deck member and the front end of the deck member utilizing said first moving apparatus;
    extending the at least two of the second plurality of rollers, the at least another two of the second plurality of rollers, and the rotatable and retractable turning member from completely within the deck member to outside the deck member; and
    rotating said cargo from one orientation on said deck member to a second orientation on said deck member utilizing said second moving apparatus and said rotatable and retractable turning member.

13. The method of claim 12 further comprising the step of attaching the cable winch member to said cargo and winching said cargo at least one of towards or away from said front end of said deck member.

14. The method of claim 12 further comprising the step of moving said cargo sideways along said deck member utilizing said second moving apparatus.

15. The method of claim 12 further comprising the steps of attaching said trailer deck to a vehicle and moving said trailer deck using said vehicle.

16. The method of claim 12 wherein the provided trailer deck further comprises a plurality of swing-arms attached to said deck member.

17. The method of claim 12 wherein the rotating step comprises rotating the cargo from the one orientation in which a side of the cargo is disposed parallel to the front and back ends of the deck member to the second orientation in which the side of the cargo is disposed parallel to the left and right sides of the deck member.

18. The method of claim 12 wherein the second plurality of rollers are aligned substantially in a circle.

19. The method of claim 18 wherein the plate is disposed in a center of the circle.

20. The method of claim 12 wherein a third moving apparatus is disposed in said tapered back end, and further comprising the step of moving cargo along the tapered back end using said third moving apparatus.

21. The method of claim 20 wherein the third moving apparatus comprises a roller.

\* \* \* \* \*